United States Patent
Herzinger et al.

(10) Patent No.: US 7,265,835 B1
(45) Date of Patent: Sep. 4, 2007

(54) SYSTEM FOR IMPLEMENTING VARIABLE RETARDER CAPABILITY IN ELLIPSOMETER, POLARIMETER OR THE LIKE SYSTEMS

(75) Inventors: Craig M. Herzinger, Lincoln, NE (US); Galen L. Pfeiffer, Lincoln, NE (US)

(73) Assignee: J.A. Woollam Co., Inc., Lincoln, NE (US)

( * ) Notice: Subject to any disclaimer, the term of this patent is extended or adjusted under 35 U.S.C. 154(b) by 38 days.

(21) Appl. No.: 11/374,771

(22) Filed: Mar. 14, 2006

Related U.S. Application Data (60) Provisional application No. 60/661,892, filed on Mar. 16, 2005.

(51) Int. Cl.
*G02B 7/02* (2006.01)

(52) U.S. Cl. ............... 356/364; 359/822; 359/384; 359/811; 359/815; 359/819; 356/365; 356/114; 356/117

(58) Field of Classification Search ........ 356/364–369; 359/496, 501, 497, 483, 822, 384, 557, 830, 359/500, 73, 83, 811, 815, 819, 827, 554, 359/487, 494
See application file for complete search history.

(56) References Cited

U.S. PATENT DOCUMENTS

| | | | | |
|---|---|---|---|---|
| 3,614,195 A | * | 10/1971 | Vollmer | 359/371 |
| 3,687,555 A | * | 8/1972 | Yamamoto et al. | 356/365 |
| 5,245,478 A | | 9/1993 | Luecke | 359/822 |
| 5,757,494 A | | 5/1998 | Green et al. | 356/369 |
| 5,956,145 A | | 9/1999 | Green et al. | 356/364 |

OTHER PUBLICATIONS

Thorlabs, Inc. Operations Manual: Soleil Babinet Compensator models: SBC-VIS, SBC-UV, SBC-IR, Version 1.4, Newton, NJ, Oct. 28, 2002.*

* cited by examiner

*Primary Examiner*—Layla G. Lauchman
*Assistant Examiner*—Rebecca C. Slomski
(74) *Attorney, Agent, or Firm*—James D. Welch (57) ABSTRACT

A system for implementing Berek-type variable retarder plate tipping capability in two orthogonal directions via tipping about a single axis, in combination with a means for rotating the orientation of the axis, having application in ellipsometer and polarimeter and the like systems.

16 Claims, 6 Drawing Sheets

SYSTEM FOR IMPLEMENTING VARIABLE RETARDER CAPABILITY IN ELLIPSOMETER, POLARIMETER OR THE LIKE SYSTEMS

This Application Claims Benefit of Provisional Application Ser. No. 60/661,892 Filed Mar. 16, 2005.

TECHNICAL FIELD

The present invention relates to systems and method of improving data acquisition capability in Ellipsometer, Polarimeter and the like systems, and more particularly is a system for implementing variable retarder capability therein.

BACKGROUND

It is well known that Rotating Polarizer and Rotating Analyzer Ellipsometer systems can not accurately monitor DELTA values near 0.0 and 180 degrees, and Modulation Element Ellipsometers also have problems monitoring PSI values near 45 degrees. U.S. Pat. Nos. 5,757,494 and 5,956,145 to Green et al., which are incorporated herein by reference, teach the application of Berek-type Variable Retarders in such Ellipsometers to improve their data acquisition capability in the identified problematic angle regions. The System disclosed in said 494 and 145 Patents provides for tipping of a Variable Retarder about each of two orthogonal axes which form a plane which is substantially perpendicular to a beam of electromagnetic radiation which passes therethrough. The preferred approach is to acquire data with said Variable Retarder oriented at "0.0 Degrees and Tipped at + and at −45 degrees Rotations about said two orthogonal axes, and the resulting Five data sets are simultaneously applied in a common regression procedure. This Methodology has been found to greatly enhance the data Acquisition capability of Rotating Analyzer and Rotating Polarizer and Modulation Element Ellipsometers Systems in the identified problematic angle regions.

The Variable Retarder "Tip" Motion Implementing System disclosed in the 494 and 145 Patents, while performing well, has been found to be expensive and cumbersome to utilize. Said "Tip" producing system requires two separate rotation producing means which are oriented orthogonally with respect to one another. The present invention is therefore a new Retarder "Tip" producing system which enables practicing the Methodology of the 494 and 145 Patents, which are incorporated by reference into this disclosure.

In light of the approach to providing the equivalent to the five data sets identified above, Applicant also discloses knowledge of a Patent to Luecke, U.S. Pat. No. 5,245,478. Said 478 Patent describes a mount for Berek-type retarders which can be both tilted, and rotated via adjustment rings which are concentric to the optical path of the device, and within which a birefringent crystal is positioned. The present invention operates on a similar basis, but does not involve the use of concentric rings or place a variable retarder plate within anything like concentric rings.

Even in view of the prior art, need remains for an improved mounting system for Berek-type retarders which find application in ellipsometers.

DISCLOSURE OF THE INVENTION

The present invention comprise a system for effecting tipping of a retarder plate about at least two axes which are offset with respect to one another, using only one tip producing means. Said system can comprise:

a) a hollow shaft rotation producing means;
b) a mounting means for securing said hollow shaft rotation producing means;
c) a bracket comprising means for accessibly securing a retarder plate thereto and means for effecting tipping of said retarder plate.

Said bracket comprises means for securing a variable retarder thereto being affixed to said hollow shaft of said hollow shaft rotation producing means such that a projected locus of said hollow shaft intersects a retarder plate affixed to said bracket means for securing a retarder plate, said locus of said hollow shaft being oriented at substantially 90 degrees to a plane formed by said at least two axes about which said retarder plate tipping can be effected. Said hollow shaft is further positioned such that a beam of electromagnetic radiation caused to progress through and exit said hollow shaft then passes through said retarder plate. In use a retarder plate is secured to said means for securing a retarder plate and said means for effecting tipping of said variable retarder is applied to cause tipping of said retarder plate about an axis projected in a first direction; followed by said hollow shaft rotation producing means being applied to reorient said first direction of said axis about which said retarder plate is caused to tip, and again applying said means for effecting tipping of said retarder plate to cause tipping of said retarder plate about an axis projected in a second direction. Tipping of said retarder plate about at least two axes orientations which are offset with respect to one another is thus achieved using only one tip producing means.

A preferred embodiment provides that said first and second axes directions are orthogonal to one another, and in which a plane formed therefrom is orthogonal to the projected locus of said hollow shaft.

Another recitation of a present invention system for effecting "tip" of a retarder plate about axes oriented orthogonally with respect to one another comprises:

means for effecting tip of a retarder plate about an axis; and
means for effecting rotation of said axis by 90 degrees functionally interconnected to said means for effecting tip of said retarder plate about an axis;

the projections of said orthogonal axes forming a plane.

Said means for effecting rotation of said axis by 90 degrees is a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

The present invention system for effecting "tip" of a retarder plate about axes oriented orthogonally with respect to one another finds use in an ellipsometer, polarimeter or the like comprising:

a source of electromagnetic radiation;
a polarizer;
a stage for supporting a sample;
an analyzer; and
a detector.

Said ellipsometer, polarimeter or the like further comprises, between said polarizer and analyzer, a system for effecting "tip" of a retarder about axes oriented orthogonally with respect to one another comprising:

means for effecting tip of a retarder plate about an axis; and means for effecting rotation of said axis by 90 degrees functionally interconnected to said means for effecting tip of said retarder plate about an axis;

the projections of said orthogonal axes forming a plane.

Said means for effecting rotation of said axis by 90 degrees is a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

Said ellipsometer, polarimeter or the like can further comprises a modulation element between said polarizer and analyzer.

A method of effecting tipping of a retarder plate about two axes comprises the steps of:

a) providing a system for effecting tipping of a retarder plate about at least two axes which are offset with respect to one another, using only one tip producing means, comprising:

a) a hollow shaft rotation producing means;
 b) a mounting means for securing said hollow shaft rotation producing means;
 c) a bracket comprising means for accessibly securing a retarder plate thereto and means for effecting tipping of said retarder plate;
 said bracket which comprises means for securing a variable retarder thereto being affixed to said hollow shaft of said hollow shaft rotation producing means such that a projected locus of said hollow shaft intersects a retarder plate affixed to said bracket means for securing a retarder plate, said locus of said hollow shaft being oriented at substantially 90 degrees to a plane formed by said at least two axes about which said retarder plate tipping can be effected;
 said hollow shaft further being positioned such that a beam of electromagnetic radiation caused to progress through and exit said hollow shaft then passes through said retarder plate;
 such that in use a retarder plate is secured to said means for securing a retarder plate and said means for effecting tipping of said variable retarder is applied to cause tipping of said retarder plate about an axis projected in a first direction;
 followed by said hollow shaft rotation producing means being applied to reorient said first direction of said axes about which said retarder plate is caused to tip, and again applying said means for effecting tipping of said retarder plate to cause tipping of said retarder plate about an axis projected in a second direction;
 such that tipping of said retarder plate about at least two axes which are offset with respect to one another is achieved using only one tip producing means.

Said method continues with;

c) affixing a retarder plate to said bracket comprising means for accessibly securing a retarder plate thereto and means for effecting tipping of said retarder plate;

d) causing said means for effecting tipping of said variable retarder to be applied to cause tipping of said retarder plate about an axis projected in a first direction; and e) causing said hollow shaft rotation producing means to be applied to reorient said first direction of said axes about which said retarder plate is caused to tip, and again applying said means for effecting tipping of said retarder plate to cause tipping of said retarder plate about an axis projected in a second direction.

Another method of effecting tipping of a retarder plate about two axes comprises the steps of:

a) providing a system for effecting tip of a retarder plate about axes oriented orthogonally with respect to one another comprising:

means for effecting tip of a retarder plate about an axis; and
 means for effecting rotation of said axis by 90 degrees functionally interconnected to said means for effecting tip of said retarder plate about an axis;
 the projections of said orthogonal axes forming a plane;
 said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

Said method continues with the steps:

b) affixing a retarder plate to said means for effecting tipping of said retarder plate;

c) causing said means for effecting tipping of said retarder plate to be applied to cause tipping of said retarder plate about an axis projected in a first direction; and d) causing said hollow shaft stepper motor to be applied to reorient said first direction of said axes about which said retarder plate is caused to tip, and again applying said means for effecting tipping of said retarder plate to cause tipping of said retarder plate about an axis projected in a second direction.

A method of enabling the acquisition of a plurality of data sets using an ellipsometer, polarimeter or the like comprises:

a) providing an ellipsometer, polarimeter or the like comprising:

a source of electromagnetic radiation;
 a polarizer;
 a stage for supporting a sample;
 an analyzer; and
 a detector;
 such that in use a beam of electromagnetic radiation is provided by said source thereof, proceeds through said polarizer, reflects from a sample placed on said stage for supporting a sample, passes through said analyzer and enters said detector;
 said ellipsometer, polarimeter or the like further comprising, between said polarizer and analyzer, a system for effecting tip of a retarder about axes oriented orthogonally with respect to one another comprising:
 means for effecting tip of a retarder plate about an axis; and
 means for effecting rotation of said axis by 90 degrees functionally interconnected to said means for effecting tip of said retarder plate about an axis;

the projections of said orthogonal axes forming a plane;

said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

Said method continues with the steps:

b) affixing a retarder plate having a substantially planar surface, to said means for effecting tipping of said retarder plate;

c) causing a beam of electromagnetic radiation provided by said source of electromagnetic radiation to proceed through said polarizer, reflect from a sample placed on said stage for supporting a sample, pass through said analyzer and enter said detector, said beam of electromagnetic radiation further passing through said hollow shaft of said stepper motor.

And for each of the following steps data is acquired from said detector which corresponds to electromagnetic radiation entering thereinto:

d) causing said means for effecting tipping of said retarder plate to be applied to cause said retarder plate to be oriented so that said beam of electromagnetic radiation approaches said substantially planar surface of said retarder plate along a substantial perpendicular thereto;

e) causing said means for effecting tipping of said retarder plate to be applied to cause tipping of said retarder plate about an axis projected in a first direction; and f) causing said hollow shaft stepper motor to be applied to reorient said direction of said axes about which said retarder plate is caused to tip, and again applying said means for effecting tipping of said retarder plate to cause tipping of said retarder plate about an axis projected in a second direction.

Said method can be modified so that step e comprises two subparts, for each of which data is acquired by said detector:

e1) causing said means for effecting tipping of said retarder plate to be applied to cause clockwise tipping of said retarder plate about an axis projected in a first direction; and e2) causing said means for effecting tipping of said retarder plate to be applied to cause counter-clockwise tipping of said retarder plate about an axis projected in said first direction.

Likewise, said method can be modified so that step d comprises two subparts, for each of which data is acquired by said detector:

d1) causing said means for effecting tipping of said retarder plate to be applied to cause clockwise tipping of said retarder plate about an axis projected in a second direction; and d2) causing said means for effecting tipping of said retarder plate to be applied to cause counter-clockwise tipping of said retarder plate about an axis projected in said second direction.

The clockwise and counter-clockwise tip angles about said axes projected in said first and/or second direction can each be 45 degrees.

The present invention will be better understood by a reading of the Detailed Description Section of this Specification, with reference to the Drawings.

SUMMARY OF THE INVENTION

It is therefore a primary purpose and/or objective of the present invention to provide a system, and method of use thereof, that enables tipping a retarder plate about at least two axes orientations utilizing a single retarder plate tip effecting means, in functional combination with a rotation effecting means for orienting said single retarder plate tip effecting means.

It is a further purpose and/or objective of the present invention to provide said system of the primary purpose and/or objective which does not comprise concentric rings, but rather comprises a single tip effecting means in functional combination with a hollow shaft rotation producing means, such as a hollow shaft stepper motor, for use in orienting said tip effecting means.

It is a further purpose and/or objective of the present invention to teach application of the system of the present invention in ellipsometer and polarimeter or the like systems.

Other purposes and/or objectives will become apparent upon a reading of the Specification and Claims.

DETAILED DESCRIPTION

Figure 1A:
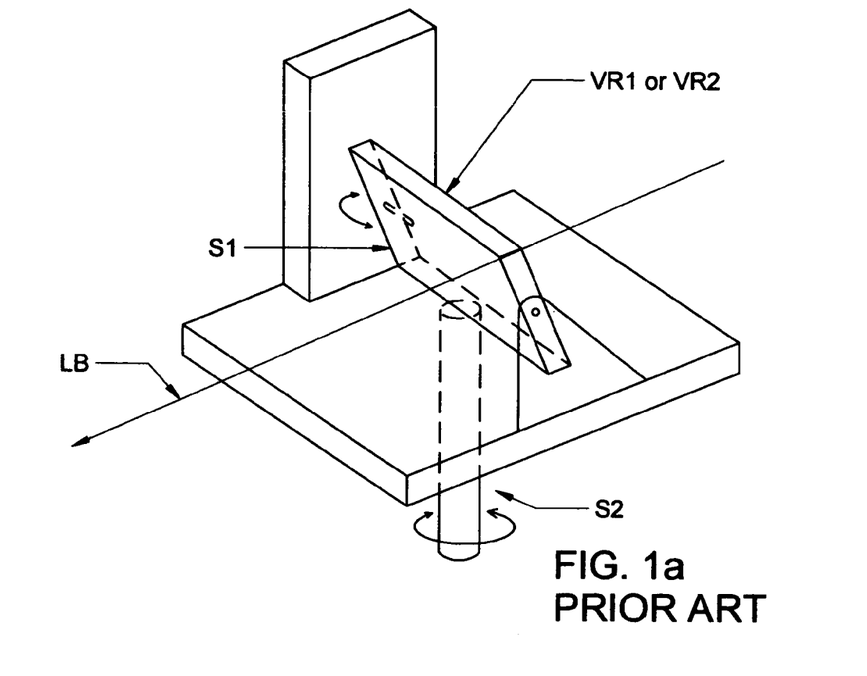
FIGS. 1a and 1b herein are FIGS. 4a and 4b from the U.S. Pat. No. 5,757,494 Patent to Green, and are included to show a prior art approach to effecting tipping in orthogonal axis directions, used by the J.A. Woollam Co. Inc.
Figure 1B:
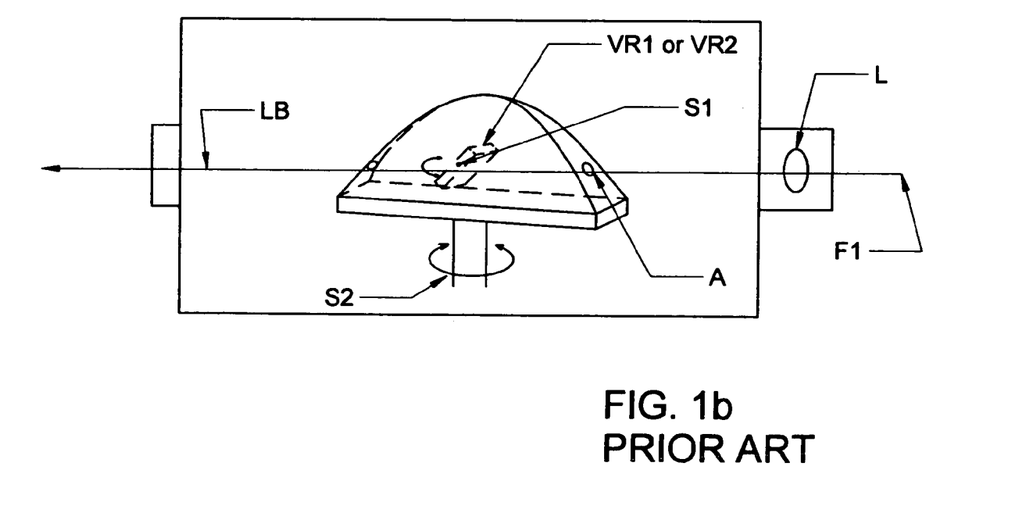
Figure 1C:
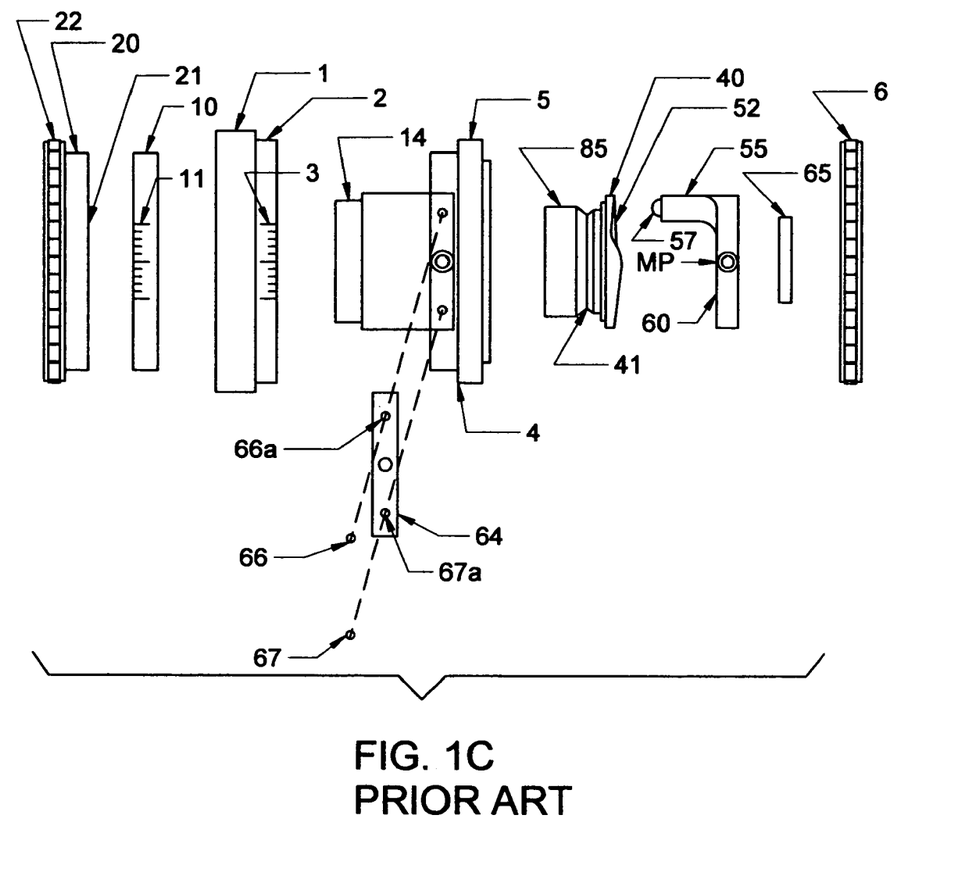
FIG. 1c shows the basics of the system presented in the Patent to Luecke, No. 5,245,478 and is fashioned from FIG. 5 thereof.

FIGS. 1a and 1b herein are FIGS. 4a and 4b from the U.S. Pat. No. 5,757,494 to Green, and are included to show a prior art approach to effecting tipping in orthogonal axis directions, used by the J.A. Woollam Co. Inc. FIG. 1c shows the basics of the system presented in the Patent to Luecke, U.S. Pat. No. 5,245,478 and is FIG. 5 therefrom. Note that the birefringent crystal (65) (eg. Berek-type retarder), in the 478 Patent is mounted to a pivotable means (57) (55) (60) which mounts to an element (40), which in turn fits in a rotation cylinder (5). Rotation Cylinder (5) rotatably fits into base ring (1). In use rotating rotation cylinder (5) in base ring (1) can be applied to cause the birefringent crystal (65) to rotate. Pushing (57) (55) causes element carrier (60) to rotate about the midpoint pivot (MP), and therefore causes the birefringent crystal (65) to tip so that a beam of electromagnetic radiation approaches at an angle-of-incidence which can be varied. In combination, the rotation and tipping can be applied to cause a birefringent crystal (65) to tip about two orthogonal axes. It is noted that this is the same as the objective of the present invention, but, as described hereinafter, the system of the present invention is very different. In particular, there is no concentric base ring (1) and Rotation Cylinder (65) in the present invention system. The present invention system is also far simpler to construct.

Figure 2A:
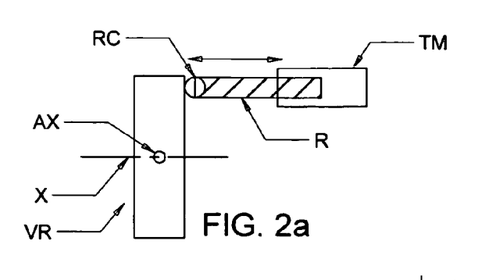
FIG. 2a shows a system for effecting "Tip" of a Variable Retarder (VR) about an Axis (AX), which is projecting into the Page.

Continuing, FIG. 2a shows a system for effecting "Tip" of a Variable Retarder (VR) about an Axis (AX) which is shown projecting into the Page. The demonstrated means for effecting "Tip" is a Threaded Rod (R) which attaches to the Variable Retarder (VR) via Attachment Means (RC) and which projects into a Motor (TM). Rotation of the Motor (TM) causes the Threaded Rod (R) to extend and retract therefrom and thereby effects "Tipping" of the Variable Retarder (VR).

Figure 2B:
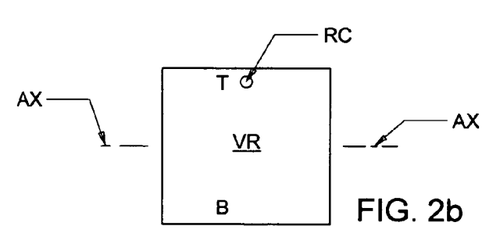
FIGS. 2b and 2c show that the Variable Retarder (VR) can be rotated about the (X) Axis in FIG. 2a, along with the Motor (TM) and Threaded Rod (R).
Figure 2C:
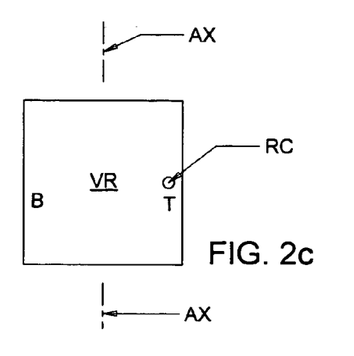
Figure 2D:
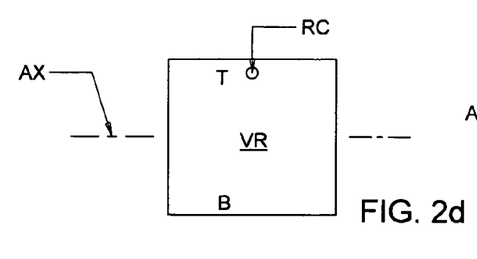
FIGS. 2d and 2e show that the Variable Retarder (VR) can be rotated about the (X) Axis in FIG. 2a, with the Motor (TM) and Threaded Rod (R) remaining in the same orientation.
Figure 2E:
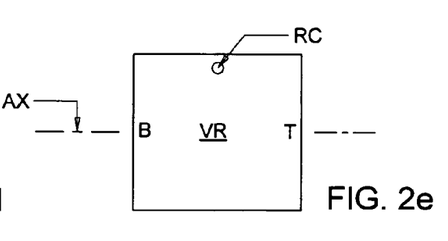
Figure 2F:
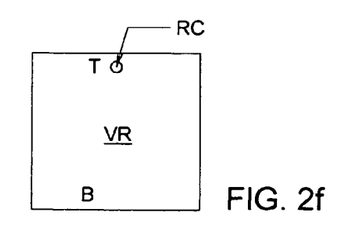
FIGS. 2f and 2g show that the Tip Producing Means (TM), Threaded Rod (R) and Attachment Means (RC) can be rotated with the Variable Retarder (VR) remaining in the same orientation.
Figure 2G:
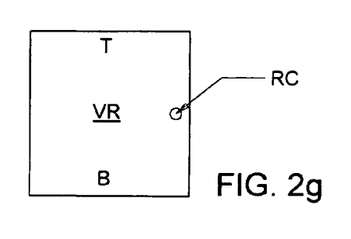

FIGS. 2b and 2c show that the Variable Retarder (VR) can be rotated about the (X) Axis in FIG. 2a, along with the Motor (TM) and Threaded Rod (R). Note that tipping of the Variable Retarder (VR) caused by the operation of (TM) (R) and (RC) in FIGS. 2b and 2c are about differently directed Axis (AX), and in fact are orthogonal to one another. Thus one Variable Retarder (VR) tip producing means, (ie. (TM) (R) and (RC)), is able to effect tipping in orthogonal directions because of the rotation of said tip producing means, (ie. (TM) (R) and (RC)) by 90 degrees. In the preferred embodiment of FIGS. 2b and 2c the Variable Retarder (VR) also rotates 90 degrees, but it should be appreciated that this need not be the case. as indicated by reference to FIGS. 2f and 2g. That is FIGS. 2f and 2g show that the Tip Producing Means (TM), Threaded Rod (R) and Attachment Means (RC) can be rotated with the Variable Retarder (VR) remaining in the same location. FIGS. 2d and 2e show that another embodiment involves the Variable Retarder (VR) being rotatable about the (X) Axis in FIG. 2a, with the Motor (TM) and Threaded Rod (R) remaining in the same orientation.

It should be appreciated that the Systems in FIGS. 2a-2g show variation on achieving the same, or related effects as achieved by the System of FIGS. 1a and 1b, (which provide two tip producing means (S1) and (S2), but that only one "Tip" producing means, (ie. the combination of (TM) (R) and (RC)), is required. The second tip producing means is simulated by a rotation of the Variable Retarder (VR), either in combination with the "Tip" producing means ((TM), (R) and (RC)) in the preferred embodiment, or independent thereof.

Turning now to FIGS. 3a, 3b, 3c and 3d, there are shown various views of a preferred embodiment of the present invention. Shown variously in said drawings is a Variable Retarder (VR) "Tip" producing means, (ie. in combination (TM), (R) and (RC)), which causes rotation of a Variable Retarder (VR) about the Axis (AX). Also shown is a Rotation Producing Means (RPM), (eg. a Hollow Shaft Stepper Motor), which rotates the Assembly (AS) which contains said Variable Retarder (VR) "Tip" producing means ((TM), (R) and (RC)). In use the Variable Retarder (VR) designations of Top "T" and Bottom "B" and the Attachment Means (RC) are shown varied by 90 degrees, as shown in FIGS. 2b and 2c by operation of the Rotation Producing Means (RPM). Mounting Means (MM) serves as a reference by which to judge the rotation of the Assembly (AS). A preferred embodiment provides that said Rotation Producing Means (RPM) be a Hollow Shaft Stepper Motor. Note that in use a beam of electromagnetic radiation passes through the Hollow Shaft (HS) of the Hollow Shaft Stepper Motor Rotation Producing Means (RPM) and through said Variable Retarder (VR). This arrangement enables relatively simple construction, as compared to previous systems which enable a similar functional end result.

Figure 3A:
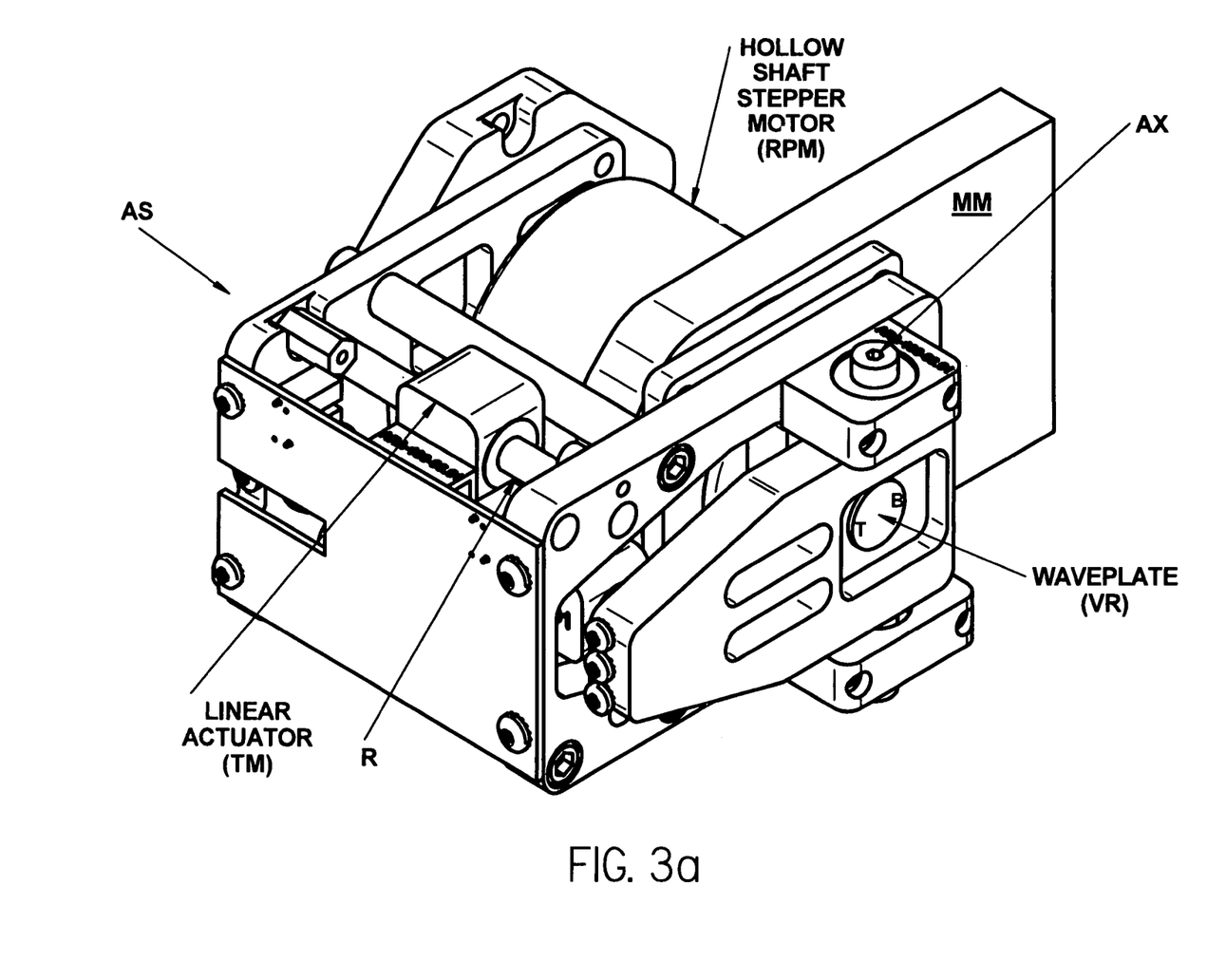
FIGS. 3a, 3b, 3c and 3d, there are shown various views of a preferred embodiment of the present invention.
Figure 3B:
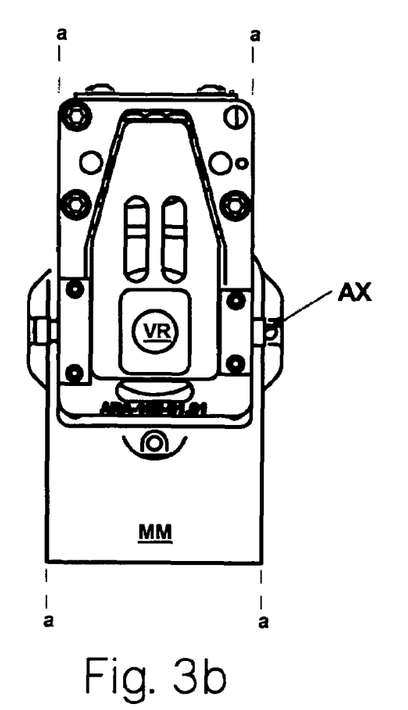
Figure 3C:
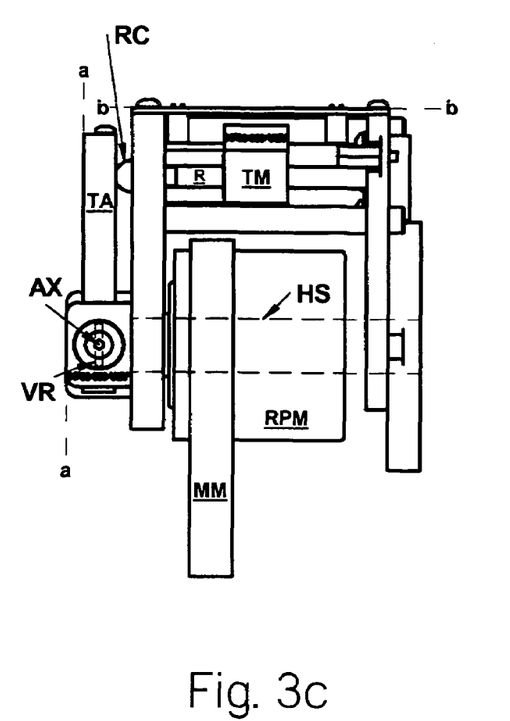
Figure 3D:
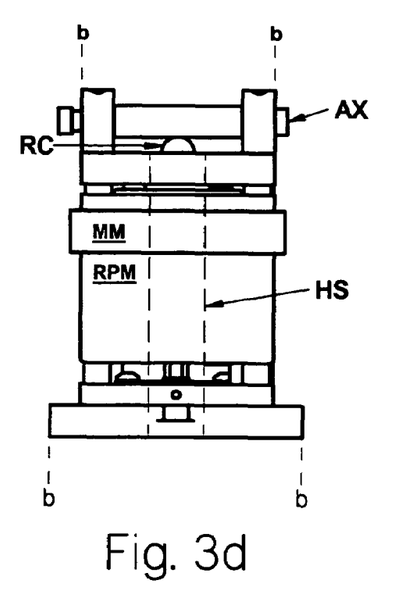

Note in particular that FIG. 3c shows, in dashed lines, the locus of the Hollow Shaft (HS) in the Hollow Shaft Stepper Motor Rotation Producing Means (RPM). Note also the presence of Variable Retarder (VR), again in dashed lines, and that it is outside the hollow shaft, unlike the Luecke, U.S. Pat. No. 5,245,478 Patent system which places a birefringement crystal inside a concentric rotation cylinder. FIG. 3b shows the Variable Retarder (VR) directly as viewed end-on taken at a - - - - - - a in FIG. 3c. Note the Rotation Axis (AX) about which the Variable Retarder (VR) can be caused to rotate, thereby causing tipping thereof. FIG. 3c shows Tipping Causing Means (TM), (eg. a solenoid or threaded rod and rotating nut system the like), which transmits linear motion via Rod (R) and Attachment Means (RC) to Tipping Arm (TA). FIG. 3d shows FIG. 3c as viewed top-down taken at b - - - - - - b, and also shows the locus of the Hollow Shaft (HS) in the Hollow Shaft Stepper Motor Rotation Producing Means (RPM).

Figure 3E:
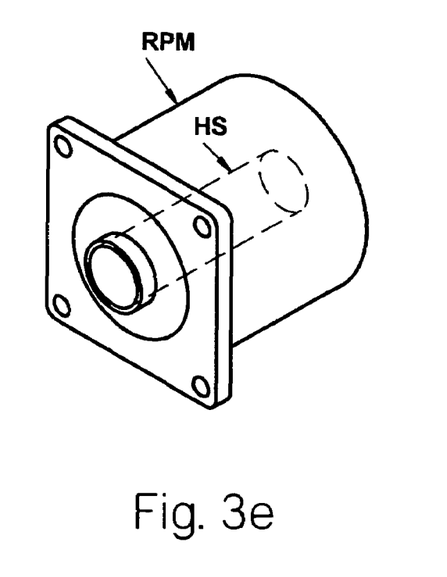
FIG. 3e is a representation of a Hollow Shaft (HS) Rotation Producing Means (RPM).

FIG. 3e is a representation of a Hollow Shaft (HS) Rotation Producing Means (RPM) such as manufactured by EAD, Part No. LA23ECK-250E.

Figure 4A:
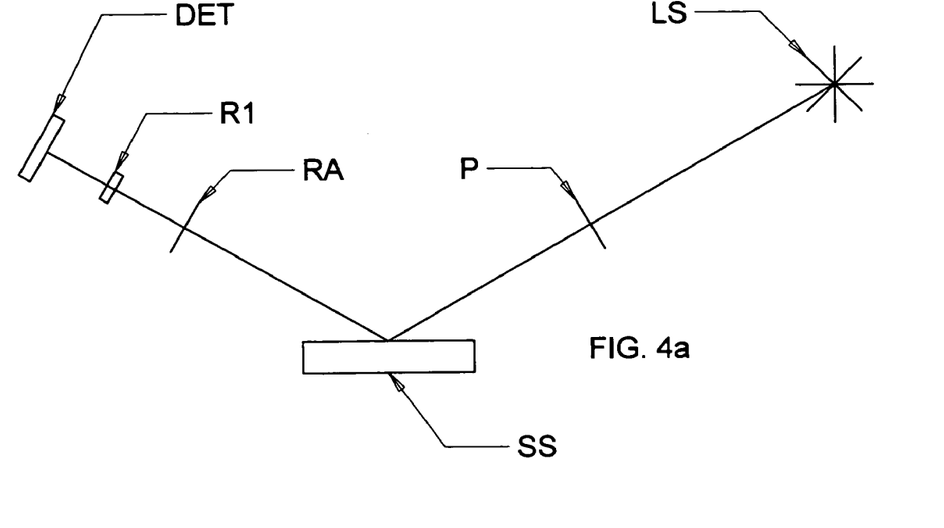
FIGS. 4a and 4b are included to demonstrate a basic Ellipsometer System, and an Ellipsometer System which includes at least one Variable Retarder (VR1) (VR2).
Figure 4B:
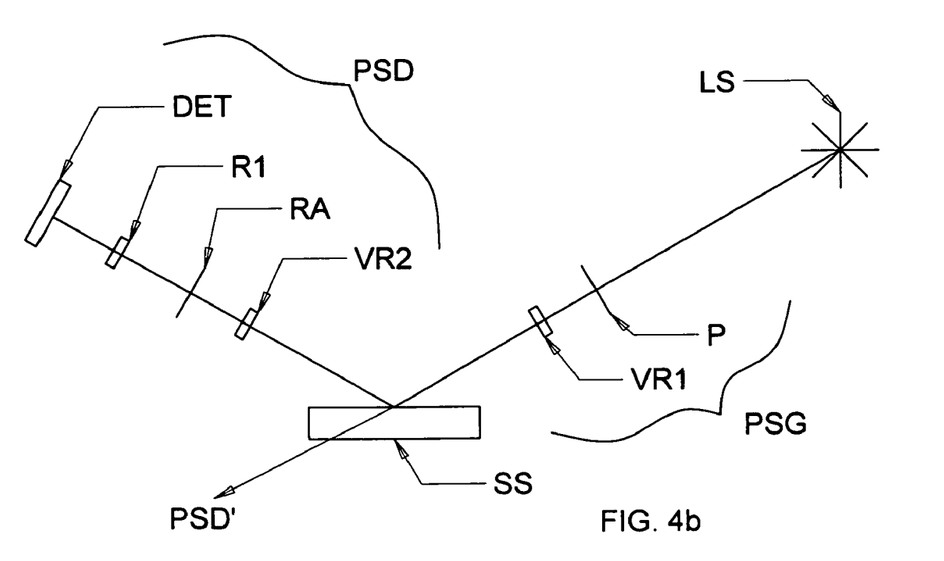

FIGS. 4a and 4b are included to demonstrate a basic Ellipsometer System, and an Ellipsometer System which includes at least one Variable Retarder (VR1) (VR2). The Ellipsometer, Polarimeter or the like comprises:
 a source of electromagnetic radiation (LS);
 a polarizer (P);
 a stage for supporting a sample (SS);
 an analyzer (RA); and
 a detector (DET).

Note that FIG. 4b shows said Ellipsometer, Polarimeter or the like further comprises, between said Polarizer (P) and Analyzer (A), at least one Variable Retarder System (VR1) (VR2) for effecting "tip" of a Retarder about axes oriented orthogonally with respect to one another. The present invention provides that said (VR1) and/or (VR2) comprise:
 means for effecting tip of a retarder plate about an axis; and
 means for effecting rotation of said axis by 90 degrees functionally interconnected to said means for effecting tip of said retarder plate about an axis;

the projections of said orthogonal axes forming a plane;

said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate. It is also mentioned that said retarder is oriented such that a beam of electromagnetic radiation from said source thereof approaches a surface thereof substantially along a normal to said surface when said retarder is not caused to be tipped about said axis.

It is believed that the presence of a present invention Variable Retarder "Tip" producing means which comprises a single tip producing means and a rotation mean for orienting it, in an Ellipsometer, Polarimeter or the like is new, novel and non-obvious.

It is noted that while the terminology "variable Retarder" is used in the foregoing for the element identified as (VR), that the actual element referred to might more generally be termed a "Retarder Plate". It is noted that the analogically similar component was termed a "birefringent crystal" in the Patent to Luecke, U.S. Pat. No. 5,245,478. In use, as described in this Specification, the function of the element (VR) is to provide a controlled variable retardence between orthogonal components of a polarized electromagnetic beam, however, the element (VR) per se. is perhaps, as indicated, better termed a "Retarder Plate". In the Claims the terminology "Retarder Plate" is used to identify the element (VR).

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

The invention claimed is:

1. A system for effecting tipping of a retarder plate about at least two axes which are offset with respect to one another, using only one tip producing means, comprising:
   a) a hollow shaft rotation producing means;
   b) a mounting means for securing said hollow shaft rotation producing means;
   c) a bracket comprising means for accessibly securing a retarder plate thereto and means for effecting tipping of said retarder plate;
said bracket which comprises means for securing a retarder plate thereto being affixed to the hollow shaft of said hollow shaft rotation producing means such that a projected locus of said hollow shaft intersects a retarder plate affixed to said bracket means for securing a retarder plate, said locus of said hollow shaft being oriented at substantially 90 degrees to a plane formed by said at least two axes about which said retarder plate tipping can be effected;
said hollow shaft further being positioned such that a beam of electromagnetic radiation caused to progress through and exit said hollow shaft then passes through said retarder plate;
such that in use a retarder plate is secured to said means for securing a retarder plate and said means for effecting tipping of said retarder plate is applied to cause tipping of said retarder plate about an axis projected in a first direction;
followed by said hollow shaft rotation producing means being applied to reorient said direction of said axis about which said retarder plate is caused to tip, and again applying said means for effecting tipping of said retarder plate to cause tipping of said retarder plate about an axis projected in a second direction;
   such that tipping of said retarder plate about at least two axes which are offset with respect to one another is achieved using only one tip producing means.

2. A system as in claim 1 in which said hollow shaft rotation producing means causes said means for accessibly securing a retarder plate thereto and said means for effecting tipping of said retarder plate causes said retarder plate and means for effecting tipping thereof to both rotate.

3. A system as in claim 1 in which said hollow shaft rotation producing means causes only said means for effecting tipping of said retarder plate to rotate.

4. A system as in claim 1 for effecting tipping of a retarder plate about two axes which are offset from one another, in which said first and second axes directions are orthogonal to one another and in which a plane formed therefrom is orthogonal to the projected locus of said hollow shaft.

5. A system for effecting tip of a retarder plate about axes oriented orthogonally with respect to one another comprising:

means for effecting tip of a retarder plate about an axis; and
   means for effecting rotation of said axis by 90 degrees functionally interconnected to said means for effecting tip of said retarder plate about an axis;
the projections of said orthogonal axes forming a plane;
said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

6. A system as in claim 5 in which said hollow shaft stepper motor causes said means for accessibly securing a retarder plate thereto and said means for effecting tipping of said retarder plate causes said retarder plate and means for effecting tipping thereof to both rotate.

7. A system as in claim 5 in which said hollow shaft stepper motor causes only said means for effecting tipping of said retarder plate to rotate.

8. An ellipsometer, polarimeter or the like comprising:
   a source of electromagnetic radiation;
   a polarizer;
   a stage for supporting a sample;
   an analyzer; and
   a detector;
such that in use a beam of electromagnetic radiation is provided by said source thereof, proceeds through said polarizer, reflects from a sample placed on said stage for supporting a sample, passes through said analyzer and enters said detector;
said ellipsometer or polarimeter further comprising, between said polarizer and analyzer, a system for effecting tip of a retarder about axes oriented orthogonally with respect to one another comprising:
   means for effecting tip of a retarder plate about an axis; and
   means for effecting rotation of said axis by 90 degrees functionally interconnected to said means for effecting tip of said retarder plate about an axis;
the projections of said orthogonal axes forming a plane;
said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate.

9. An ellipsometer, polarimeter or the like as in claim 8 which further comprises a modulation element between said polarizer and analyzer.

10. A method of effecting tipping of a retarder plate about two axes comprising the steps of:
   a) providing a system for effecting tipping of a retarder plate about at least two axes which are offset with respect to one another, using only one tip producing means, comprising:
      a) a hollow shaft rotation producing means;
      b) a mounting means for securing said hollow shaft rotation producing means;
      c) a bracket comprising means for accessibly securing a retarder plate thereto and means for effecting tipping of said retarder plate;

said bracket which comprises means for securing a retarder plate thereto being affixed to said hollow shaft of said hollow shaft rotation producing means such that a projected locus of said hollow shaft intersects a retarder plate affixed to said bracket means for securing a retarder plate, said locus of said hollow shaft being oriented at substantially 90 degrees to a plane formed by said at least two axes about which said retarder plate tipping can be effected;

said hollow shaft further being positioned such that a beam of electromagnetic radiation caused to progress through and exit said hollow shaft then passes through said retarder plate;

such that in use a retarder plate is secured to said means for securing a retarder plate and said means for effecting tipping of said retarder plate is applied to cause tipping of said retarder plate about an axis projected in a first direction;

followed by said hollow shaft rotation producing means being applied to reorient said first direction of said axes about which said retarder plate is caused to tip, and again applying said means for effecting tipping of said retarder plate to cause tipping of said retarder plate about an axis projected in a second direction;

such that tipping of said retarder plate about at least two axes which are offset with respect to one another is achieved using only one tip producing means;

d) affixing a retarder plate to said bracket comprising means for accessibly securing a retarder plate thereto and means for effecting tipping of said retarder plate;

e) causing said means for effecting tipping of said retarder plate to be applied to cause tipping of said retarder plate about an axis projected in a first direction; and f) causing said hollow shaft rotation producing means to be applied to reorient said first direction of said axes about which said retarder plate is caused to tip, and again applying said means for effecting tipping of said retarder plate to cause tipping of said retarder plate about an axis projected in a second direction.

11. A method of effecting tipping of a retarder plate about two axes comprising the steps of:

a) providing a system for effecting tip of a retarder plate about axes oriented orthogonally with respect to one another comprising:

means for effecting tip of a retarder plate about an axis; and means for effecting rotation of said axis by 90 degrees functionally interconnected to said means for effecting tip of said retarder plate about an axis;

the projections of said orthogonal axes forming a plane;

said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate;

b) affixing a retarder plate to said means for effecting tipping of said retarder plate;

c) causing said means for effecting tipping of said retarder plate to be applied to cause tipping of said retarder plate about an axis projected in a first direction; and d) causing said hollow shaft stepper motor to be applied to reorient said first direction of said axes about which said retarder plate is caused to tip, and again applying said means for effecting tipping of said retarder plate to cause tipping of said retarder plate about an axis projected in a second direction.

12. A method of enabling the acquisition of a plurality of data sets using an ellipsometer, polarimeter or the like comprising:

a) providing an ellipsometer, polarimeter or the like comprising:

a source of electromagnetic radiation;

a polarizer;

a stage for supporting a sample;

an analyzer; and a detector;

such that in use a beam of electromagnetic radiation is provided by said source thereof, proceeds through said polarizer, reflects from a sample placed on said stage for supporting a sample, passes through said analyzer and enters said detector;

said ellipsometer, polarimeter or the like further comprising, between said polarizer and analyzer, a system for effecting tip of a retarder about axes oriented orthogonally with respect to one another comprising:

means for effecting tip of a retarder plate about an axis; and means for effecting rotation of said axis by 90 degrees functionally interconnected to said means for effecting tip of said retarder plate about an axis;

the projections of said orthogonal axes forming a plane;

said means for effecting rotation of said axis by 90 degrees being a hollow shaft stepper motor with the locus of said hollow shaft being oriented to project at substantially 90 degrees to said plane formed by the projections of said orthogonal axes, said hollow shaft further being positioned such that a beam of electromagnetic radiation caused to progress through and exit said hollow shaft then passes through said retarder plate;

b) affixing a retarder plate having a substantially planar surface, to said means for effecting tipping of said retarder plate;

c) causing a beam of electromagnetic radiation provided by said source of electromagnetic radiation to proceed through said polarizer, reflect from a sample placed on said stage for supporting a sample, pass through said analyzer and enter said detector, said beam of electromagnetic radiation also passing through said hollow shaft of said stepper motor; and for each of the following steps acquiring data from said detector which corresponds to electromagnetic radiation entering thereinto;

d) causing said means for effecting tipping of said retarder plate to be applied to cause said retarder plate to be oriented so that said beam of electromagnetic radiation approaches said substantially planar surface of said retarder plate along a substantial perpendicular thereto;

e) causing said means for effecting tipping of said retarder plate to be applied to cause tipping of said retarder plate about an axis projected in a first direction; and f) causing said hollow shaft stepper motor to be applied to reorient said direction of said axis about which said retarder plate is caused to tip, and again applying said means for effecting tipping of said retarder plate to cause tipping of said retarder plate about an axis projected in a second direction.

13. A method as in claim 12 in which step e comprises two subparts, for each of which data is acquired by said detector:

e1) causing said means for effecting tipping of said retarder plate to be applied to cause clockwise tipping of said retarder plate about an axis projected in a first direction; and
e2) causing said means for effecting tipping of said retarder plate to be applied to cause counter-clockwise tipping of said retarder plate about an axis projected in said first direction.

14. A method as in claim 12 in which step d comprises two subparts, for each of which data is acquired by said detector:
   d1) causing said means for effecting tipping of said retarder plate to be applied to cause clockwise tipping of said retarder plate about an axis projected in a second direction; and
   d2) causing said means for effecting tipping of said retarder plate to be applied to cause counter-clockwise tipping of said retarder plate about an axis projected in said second direction.

15. A method as in claim 13 in which the clockwise and counter-clockwise tip angles about said axis projected in said first direction are each 45 degrees.

16. A method as in claim 14 in which the clockwise and counter-clockwise tip angles about said axis projected in said second direction are each 45 degrees.

* * * * *